United States Patent
Radhakrishnan et al.

(10) Patent No.: US 9,043,811 B2
(45) Date of Patent: May 26, 2015

(54) VIRTUAL MACHINE COMMUNICATION

(71) Applicant: NetApp Inc., Sunnyvale, CA (US)

(72) Inventors: Prashanth Radhakrishnan, Sunnyvale, CA (US); Kiran Nenmeli Srinivasan, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/863,199

(22) Filed: Apr. 15, 2013

(65) Prior Publication Data

US 2013/0232491 A1 Sep. 5, 2013

Related U.S. Application Data

(63) Continuation of application No. 12/138,855, filed on Jun. 13, 2008, now Pat. No. 8,429,675.

(51) Int. Cl.
*G06F 3/00* (2006.01)
*G06F 9/44* (2006.01)
*G06F 9/46* (2006.01)
*G06F 13/00* (2006.01)
*G06F 9/455* (2006.01)
*G06F 9/50* (2006.01)
*G06F 9/54* (2006.01)

(52) U.S. Cl.
CPC ........ *G06F 9/45533* (2013.01); *G06F 9/45558* (2013.01); *G06F 2009/45583* (2013.01); *G06F 9/5077* (2013.01); *G06F 9/544* (2013.01)

(58) Field of Classification Search
USPC ........................................................ 719/319
See application file for complete search history.

(56) References Cited

U.S. PATENT DOCUMENTS

| | | | |
|---|---|---|---|
| 6,757,731 B1 * | 6/2004 | Barnes et al. | 709/227 |
| 6,952,722 B1 | 10/2005 | Podila | |
| 7,346,909 B1 * | 3/2008 | Eldar et al. | 719/312 |
| 7,571,440 B2 * | 8/2009 | Vessey et al. | 719/312 |
| 7,630,368 B2 * | 12/2009 | Tripathi et al. | 370/389 |
| 7,788,522 B1 | 8/2010 | Abdelaziz | |
| 2007/0288921 A1 | 12/2007 | King | |

OTHER PUBLICATIONS

Fraser, Keir.., et al.; "Safe Hardware Access with the XEN Virtual Machine Monitor", 1st Workshop on Operating System and Architecture Support for the on Demand IT Infrastructure. (OASIS). http://www.cl.cam.ac.uk/research/srg/netos/papers/2004-oasis-ngio.pdf Published Date: Oct. 2004. pp. 1-10.

(Continued)

*Primary Examiner* — Emerson Puente
*Assistant Examiner* — Kacy Verdi
(74) *Attorney, Agent, or Firm* — Cooper Legal Group, LLC

(57) ABSTRACT

Two or more virtual machines may be co-located on a same physical machine, and the virtual machines may communicate with each other. To establish efficient communication, memory mapping information for respective virtual machines can be exchanged between the respective virtual machines. An instance of a virtualized network interface can be established, and a direct communications channel can be mapped between respective virtualized network interfaces. Data packet routing information can be updated, such that data packets transferred between two of more co-located virtual machines can be transferred using the virtualized network interface communications channel.

20 Claims, 8 Drawing Sheets

(56) References Cited

OTHER PUBLICATIONS

Zhang, Xiaolan, et al.; "XenSocket: A High-throughput Interdomain Transport for VMs". Middleware. In: International Conference on Distributed Systems Platforms and Open Distributed Processing/Open Distributed Processing—Middleware(ODP), http://jlg.name/papers/2007-11-28-middleware-xensocket-a-high-throughput-interdomain-transport-for-virtual-machines.pdf Published Date : Nov. 26-30, 2007 pp. 184-203.

Wang, Jian., et al.; "XenLoop: A Transparent High Performance Inter-VM Network Loopback". In Proceedings of International Symposium on High Performance Distributed Computing (HPDC). http://citeseerx.ist.psu.edu/viewdoc/summary;jsessionid=35804848A5E3FB34D91E57894404E51E?doi=10.1.1.154.8891 Published Date: Jun. 2008 pp. 1-10.

Kim, Kangho., et al.: Inter-Domain Socket Communications Supporting High Performance and Full Binary Compatibility on Xen.: VEE 2008. http://csl.skku.edu/papers/vee08.pdf Published Date: Mar. 2008 pp. 1-10.

Notice of Allowance cited in related U.S. Appl. No. 12/138,855 Published Date: Dec. 26, 2012 pp. 1-66.

Amendment cited in related U.S. Appl. No. 12/138,855 Published Date: Sep. 27, 2012 pp. 1-31.

Non Final Office Action cited in related U.S. Appl. No. 12/138,855 Published Date: Jun. 27, 2012 pp. 1-47.

\* cited by examiner

VIRTUAL MACHINE COMMUNICATION

RELATED APPLICATIONS

This application is a continuation of U.S. application Ser. No. 12/138,855, now U.S. Pat. No. 8,429,675, filed on Jun. 13, 2008, entitled "VIRTUAL MACHINE COMMUNICATION", at least some of which may be incorporated herein.

BACKGROUND

In a computing environment, a Virtual Machine Monitor (VMM) is a software program that can present a virtualized physical machine interface on top of which multiple Operating Systems, including unmodified user applications, can be run. A virtual machine may be an instance of an operating system that executes on the VMM. Virtual machines may be used to concurrently run two or more different operating systems on a single physical computer system, for example, to isolate test and beta versions of computer program modules, without affecting other systems on a computer system. Further, virtual machines may be used to separate storage on a computer system, in order to create isolated storage systems.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Two or more virtual machines (VMs) may be co-located on a same physical machine. Often, co-located VMs may need to communicate with each other. For example, a software module in one VM may use a service located in another co-located VM. Typically, this communication happens via network protocols, for both co-located and non-co-located VMs. In this way, for example, communication between co-located VMs can be inefficient when compared with communication between two processes in an operating system (OS) as the communication can traverse multiple software layers and involves data copies. As an example, when co-located VMs wish to communicate with each other, one VM makes a processor-intensive procedure call into the hypervisor (e.g., a hypercall), and a communication channel is run through the hypervisor to a second VM. In some systems, this communication may be routed through an intermediate VM (e.g., a device driver VM) that hosts the network device driver.

There are current systems that attempt to overcome these issues. For example, one technique (e.g., Xen Split Drivers in Xen VMM: K. Fraser, *Safe hardware access with the Xen virtual machine monitor*, OASIS, October 2004.) supports a restricted inter-VM communication path using a virtualized Ethernet interface. However, this technique also incurs expensive copying of data and hypercalls, as well as involving a device driver VM in the critical path. Other techniques either use data packet snooping and copying (e.g., XenLoop: J. Wang, *A Transparent High Performance Inter-VM Network Loopback*, HPDC, Boston, Mass., June 2008.), which is processor-intensive; a socket-like interface (e.g., Xen Socket: X. Zhang, *A High-throughput Interdomain Transport for VMs*; Middleware 2007, November 2007, Newport Beach, Calif.), which is highly intrusive and not transparent to applications; or a communication mechanism (e.g., XWay, K. Kim, *Interdomain socket communications supporting high performance and full binary compatibility on Xen*; VEE 2008.) that works only for a specific network protocol (at the data transport layer), which is neither a general solution, nor an appealing one from a software design perspective. It may be desirable to have a technique and system for communicating between co-located VMs that is performant (e.g., provide high throughput and low latency), transparent (e.g., provide a transparent interface that mitigates modification of guest OS subsystems and user applications), non-intrusive (e.g., implementable without having to modify the guest OS or hypervisor sources), and dynamic (e.g., an ability to be enabled or disabled without having to disrupt execution of a VM).

Techniques and systems are disclosed herein for communicating between two or more co-located VMs. The techniques and systems comprise, among other things, efficient exchange of information between two or more VMs, for example, co-located on a same physical machine. Co-located VMs mutually can share respective physical memories, for example, in a read-only manner prior to actual communication. In this example, rather than copying data for communication, pointers to data are transferred between VMs. The sharing of VM memories can, for example, lead to an efficient communication channel between co-located VMs, without utilizing intermediate VMs. Further, to facilitate typical network protocol communications between applications in co-located VMs, a communication channel is exported as an instance of a virtualized network interface. Routing information can be updated for packet data, such that data packets that are transferred between co-located VMs can be sent using the virtualized network interface. As an example, Internet Protocol (IP) routing tables can be updated in a TCP/IP stack of the respective VMs with IP information, which enables data transfer across the direct communications channel between VMs. In this example, the update to the routing table can happen after establishing the virtualized network interface.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
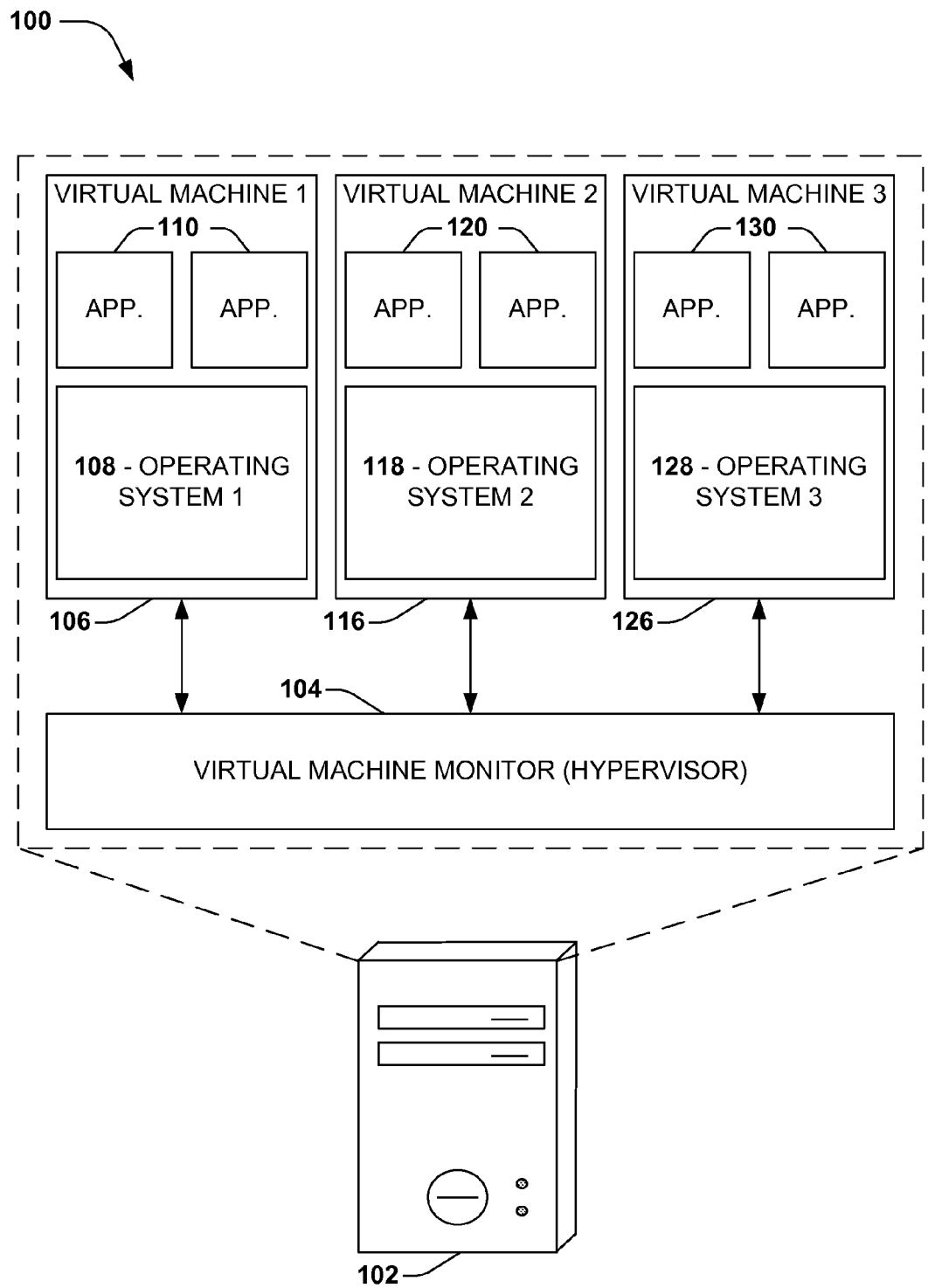
FIG. 1 is an illustration of one embodiment of virtual machines.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Embodiments described herein relate to techniques and systems for facilitating efficient communication between two or more virtual machines co-located on a same physical machine.

FIG. 1 is an illustration of one embodiment 100 of virtual machines. In this embodiment 100 a single physical computer system 102 (e.g., a personal desktop computer) may contain one or more instantiations of a virtual machine, such as virtual machine 1 106, virtual machine 2 116, virtual machine 3 126, etc. Virtual machines, for example, may allow multiplexing of the underlying physical computer. Two or more virtual machines may be installed on a computer system in order to isolate software modules or operating systems. In this example, a programmer may wish to isolate the modules so that a beta test of the software can be run in a particular operating system on the computer, isolated from the rest of the system.

In this embodiment 100, the computer system 102 has a software layer called a virtual machine monitor 104 (hypervisor) installed thereon, which provides a virtualization platform and may be used to manage and monitor the one or more instantiations of virtual machines (e.g., 106, 116, 126, etc.) on the computer 102. In this example, the hypervisor 104 is installed directly on the native hardware of the computer 102; however, hypervisors may also be installed as a software layer in a native operating system, known as a host operating system.

In this embodiment 100 the hypervisor 104 has three instantiations of virtual machines (e.g., 106, 116, 126) installed thereon. Respective virtual machines can contain a different or a same operating system, such as operating system 1 108, operating system 2 118, operating system 3 128, etc. (e.g., some of which may be the same or different operating systems) and various program applications, such as a first set of program applications 110, a second set of program applications 120, a third set of program applications 130, etc. (e.g., where some of the program applications may be the same or different applications). As described above, the operating systems and applications run substantially isolated from the other virtual machines co-located on the same physical machine 102. Respective virtual machines communicate directly with the hypervisor 104, which in-turn, communicates with the respective virtual machines. Therefore, in this example, in order for the virtual machines to communicate with each other, messages will first pass through and be managed by the hypervisor 104, which may not be an efficient technique for virtual machine communication.

Figure 2:
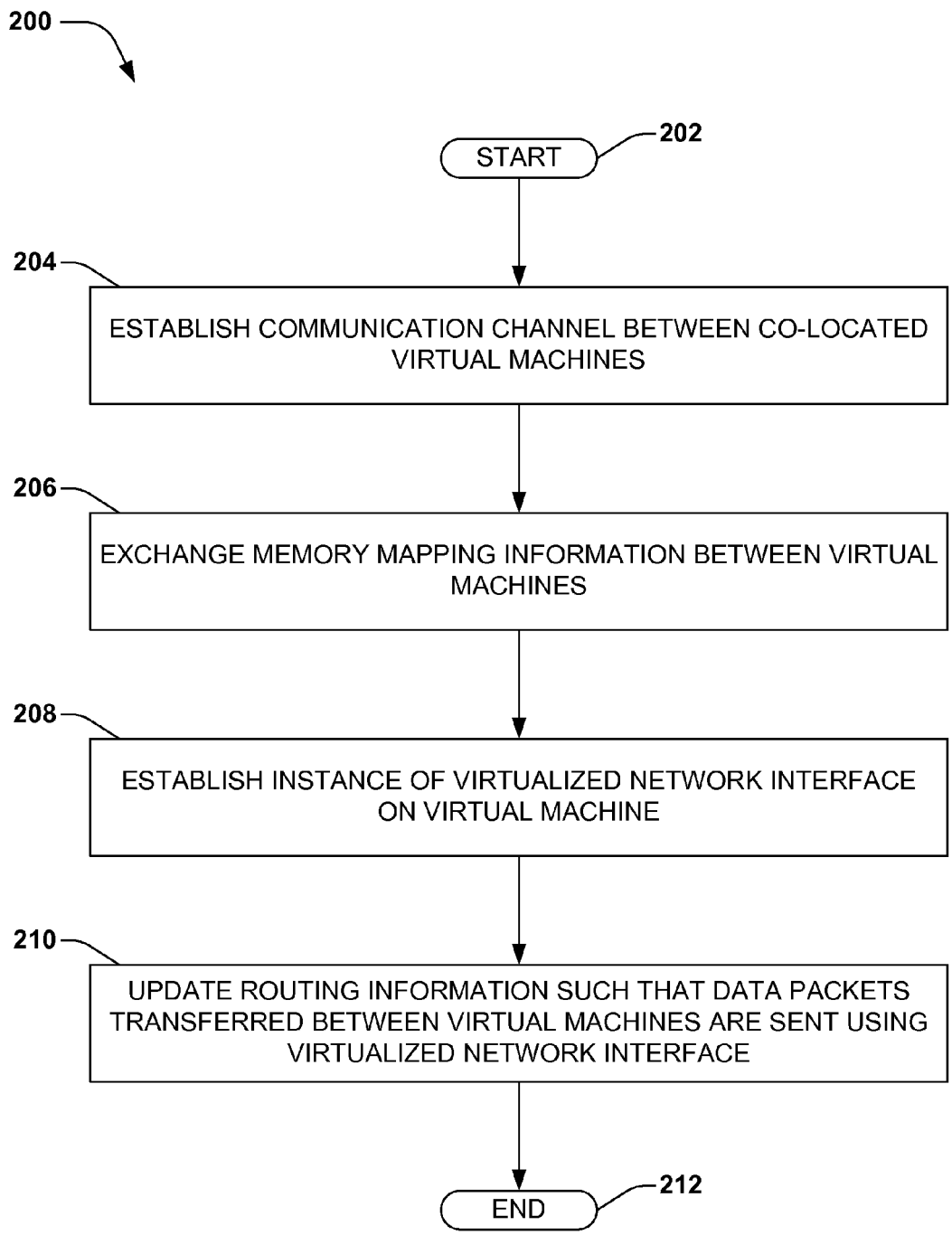
FIG. 2 is a flow diagram of an exemplary method for efficiently communicating between two or more virtual machines co-located on a same physical machine.

FIG. 2 is a flow diagram of an exemplary method 200 for efficiently communicating between two or more virtual machines co-located on a same physical machine. The exemplary method 200 begins at 202 and involves establishing a communication channel between co-located VMs, at 204. For example, a direct communications channel can be established between respective co-located VMs, without routing calls through the hypervisor.

Figure 3:
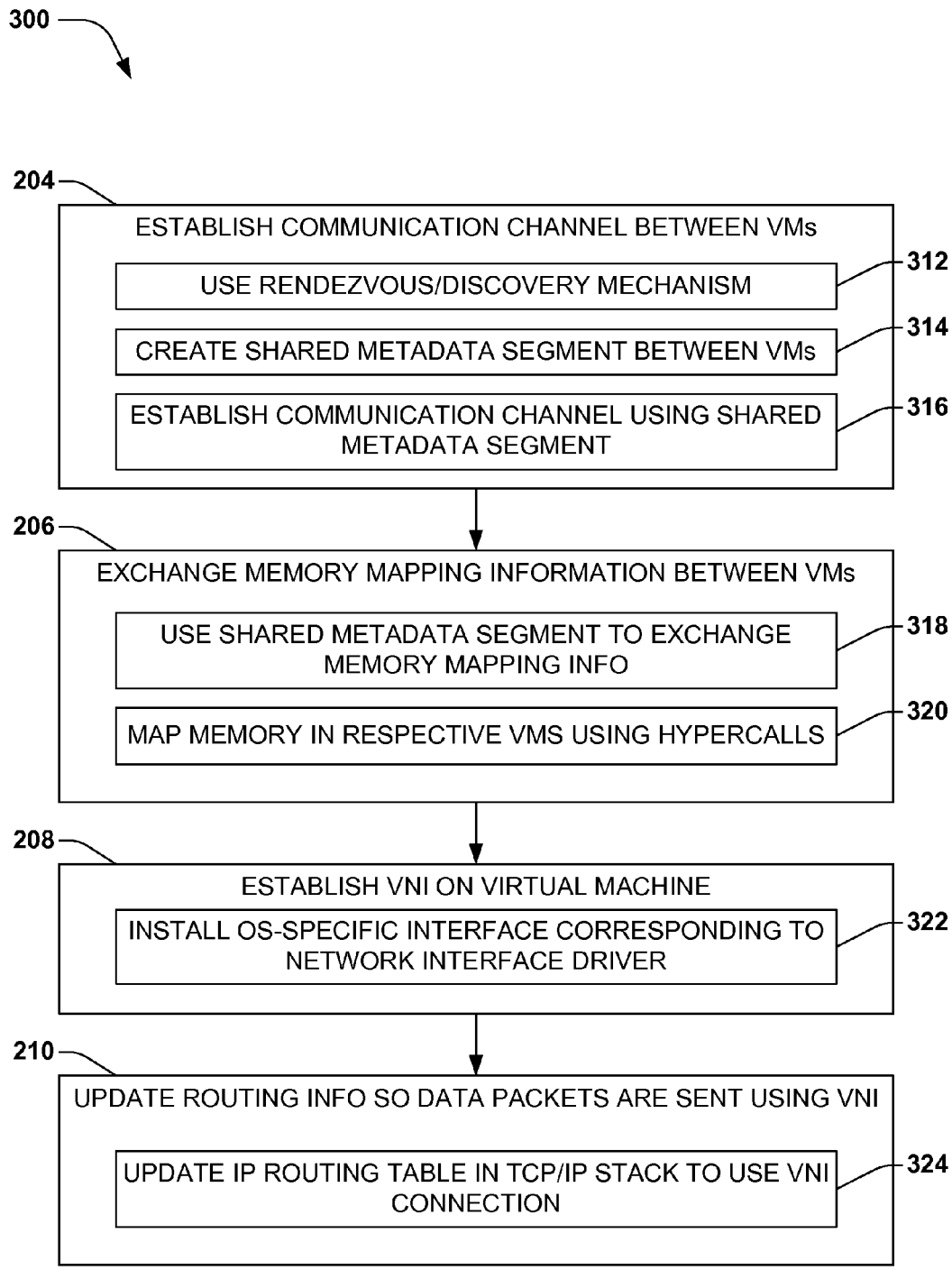
FIG. 3 illustrates one embodiment of the exemplary method for efficiently communicating between two or more virtual machines co-located on a same physical machine.

FIG. 3 illustrates one embodiment 300 of the exemplary method 200 for efficiently communicating between two or more virtual machines co-located on a same physical machine. At 204 in the embodiment 300, the establishment of a communication channel between co-located VMs can involve using a rendezvous/discovery mechanism (e.g. a generic term referring to a synchronization process/mechanism that uses a system call to allow two processes to synchronize to exchange data) to find a co-located VM, at 312. At 314, a metadata is created that is shared between the co-located VMs. As an example, a shared metadata segment can be created 314 during an establishment of a connection between a new instantiation of a VM and one or more existing VMs.

At 316, the shared metadata segment may be used to establish a communication channel between the co-located VMs. For example, the metadata segment 316 may be used for signaling and sharing information between the co-located VMs. In this example, the metadata segment can be established 314 using the rendezvous mechanism between VMs 312. The rendezvous mechanism can be implemented using a hypervisor-specific associated database (e.g., a key-value database). Further, in this example, rendezvous/discovery mechanism 312 can proceed in an asynchronous, event-driven manner to allow for a VM to establish a connection with multiple VMs substantially concurrently.

Turning back to FIG. 2, at 206, memory mapping information (e.g., pointers pointing to specifically identified memory segments in a virtual machines physical memory, which may contain specifically identified portions of data) is exchanged between one or more co-located virtual machines. For example, the memory pointers of a first VM can be transferred to a physical memory of a second VM. In one embodiment, the exchanging of memory mapping information occurs prior to data transfer between VMs. In this embodiment, when a first VM transfers data to a second VM, the first VM can pass pointers to the data to the second VM, rather than performing a processor-intensive technique of copying the data. Additionally, as an example, physical memory of the first VM can be mapped into the second co-located VM's memory address spaces, prior to data transfer, in a read-only manner. In this example, the read-only manner mitigates an implementation bug causing the first VM to overwrite the second VM's memory. Also, in this example, if the first VM's memory is mapped into the second VM, resource costly calls to a hypervisor when mapping memory dynamically can be avoided.

In the embodiment 300 of FIG. 3, the exchanging of memory mapping information between virtual machines (VMs) 206, can involve the participating VMs exchanging information needed for mapping the memory of a first VM to a second VM over the metadata segment, at 318. At 320, memory mapping pointers from the first VM can be mapped into the memory of the second VM using hypercalls through the hypervisor. In this way, for example, once the first VM's memory has been exchanged and mapped, the second VM can have direct access to information stored in the first VM's memory.

Once again turning back to FIG. 2, in the exemplary method 200, at 208, an instance of a virtualized network interface in one or more virtual machines (VMs) is established. Establishing a virtualized network interface (VNI) in a VM, for example, may allow for a transparent direct communications channel to be established directly between VNIs in respective VMs. In one embodiment, establishing a virtualized network interface can be performed by installing a software module that performs network interface tasks (e.g., communication with other elements on the network), without using a hardware network interface device (e.g., instead using a native communication layer in a virtual machine).

In embodiment 300 of FIG. 3, at 208, an operating system (OS)-specific interface, corresponding to a network interface driver, is established in the VM 322. This mechanism can create an instance of a virtualized network interface device in the VM. As an example, the VNI in the VM can be presented as a network device (e.g., Ethernet interface) to the applications in the VM. Presentation in this manner may allow for a transparent communications channel to be established between co-located VMs, using the VNI.

In this embodiment, unlike in existing systems, signaling between VMs does not utilize interrupts, which require processor-intensive hypercalls. In one example, signaling between VMs may be implemented by polling on shared memory counters, using a processor core dedicated for communication. In another example, an efficient interrupt mechanism that avoids hypercalls may be used. In this example, a source VM can control the scheduling of a destination VM (e.g., a VM can schedule a signal processing thread in the destination VM as part of signaling the VM). It will be appreciated that, while the first example of signaling over a communications channel may be preferable due to its less intrusive nature, the techniques and systems, described herein, are not limited to a particular signaling mechanism.

In the exemplary method 200 of FIG. 2, at 210, data routing information is updated, such that data packets transferred between VMs is sent using respective VNIs. After a communications channel has been established between co-located VMs, for example, data packets destined to and from the VMs should be routed through the respective VNIs in order to take advantage of the direct communication channel.

In embodiment 300 of FIG. 3, at 210, the routing information is updated by updating the routing information in an Internet protocol (IP) routing table in a TCP/IP stack of the respective VMs, so that data packets destined to a VM are routed through the respective VNI, at 324. As an example, in order to update the IP routing table an IP address of the respective VM should be known. This information is typically available through the hypervisor. In this example, the available IP address information for respective co-located VMs can be used to update the IP routing table in the TCP/IP stack of respective VMs.

Having updated the routing information, the exemplary method 200, in FIG. 2, ends at 212.

In one aspect, as described above, a VM's memory is mapped a priori, for example, to avoid copying data. Further, polling is employed rather than interrupts, for example, to avoid hypercalls. Additionally, for example, in order to facilitate transparency to applications, the communications channel technique exports a standard network device interface. As a result, in this aspect, OS-specific packet data structures may be used in data paths.

In one embodiment, two VMs running different OSs (as in FIG. 1) can be made to communicate using the aforementioned techniques. In this embodiment, in a send data path, source OS-specific packet data structures can be packed into an OS-independent shared memory communications format, in a zero-copy manner (e.g., without making a copy). Similarly, in this embodiment, in a receive data path, the OS-independent shared memory communications format can be assembled into a destination OS-specific packet data structure. The data in the destination OS-specific packet data structure, for example, can then be delivered to a destination OS through the VNI.

Figure 4:
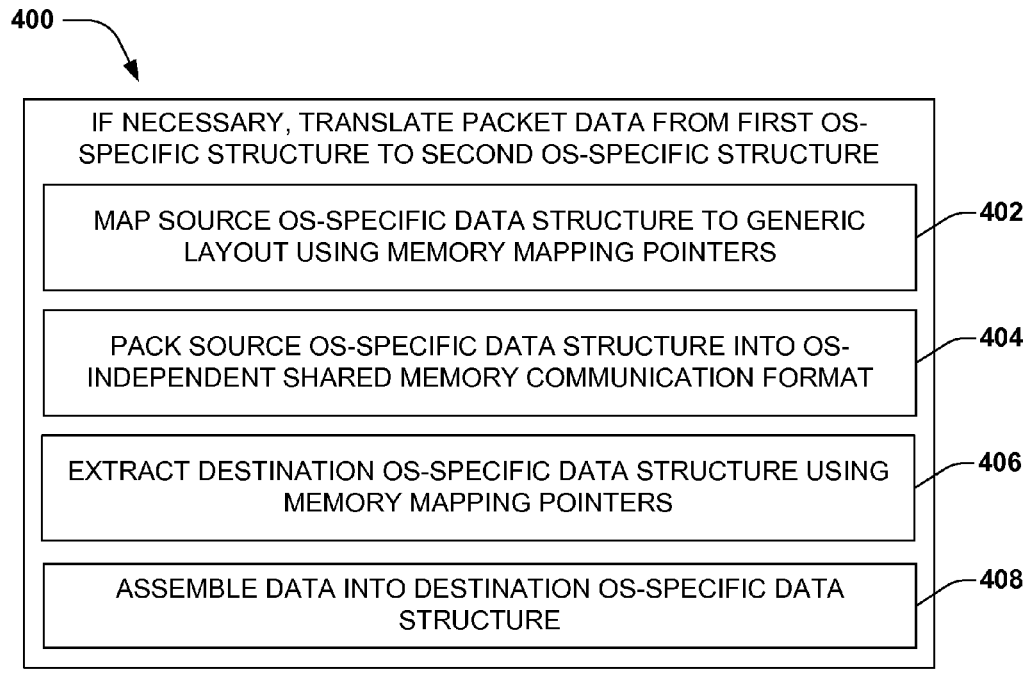
FIG. 4 is an illustration of one embodiment an exemplary method for translating packet data from a first OS-specific packet data structure to a second OS-specific packet data structure.

FIG. 4 is an illustration of one embodiment 400 of an exemplary method for translating packet data from a first OS-specific packet data structure to a second OS-specific packet data structure. As an example, translating of OS-specific packet data may be needed if a first VM utilized a different OS than a second VM, and the respective VMs were attempting to transfer data between each other. In this example, different communications protocols (e.g., from different OSs) can use different conventions for distinguishing between elements of the packet data and formatting of the data. Therefore, a method can be used to translate between the different conventions used by different protocols, for example.

At 402, a source OS-specific packet data structure is mapped to a generic (e.g., independent of OS) packet data structure using memory mapping pointers. At 404, source OS-specific packet data structure is packed into an OS-independent shared memory communications format. As an example, during the initial memory mapping, memory mapping pointers are created, which may be used to pack memory mapping information into an OS-independent shared memory communications format.

At 406, destination OS-specific packet data structure mapping information can be extracted from the OS-independent shared memory communications format, using memory mapping pointers, for example, created during the memory mapping process. At 408, the destination OS-specific packet data structure mapping information can be packed into a destination OS-specific data structure. As an example, the destination OS-specific packet data structure can be delivered to an OS on the destination VM. As a result, the original source OS-specific packet data has been translated into destination OS-specific packet data, and may now be utilized by the destination VM.

In another aspect, it may be desirable to identify instantiations of VMs running on a physical machine, in order to enable dynamic creation and removal of the aforementioned communications channel between VMs. In this aspect, for example, it may be desirable to determine when a VM is created, resumed, or migrated onto the physical machine. Further, for example, it may also be desirable to determine when a VM is destroyed, suspended or migrated out of a physical machine.

In one embodiment, when a VM is instantiated on the physical machine, new connection channels can be established between the new instantiated VM and co-located VMs. In this embodiment, a membership mechanism can be used to determine if a VM has been new instantiated. As an example of the membership mechanism being used to determine if a VM has been newly instantiated, an associated array database (e.g., one aspect of a membership mechanism that utilizes a key-value pair), supported by the hypervisor, can be used in a generic manner to determine membership. In this example, one or more VMs already located on the physical machine can poll the database or subscribe to notifications from the database using a specified key. When a VM is created on, resumed or migrated into the physical machine it can update the key with a specified value. In this way, for example, a notification to the co-located VMs can be triggered, which in turn, can trigger connection establishment between the co-located VMs.

In another embodiment, VM destruction, suspension or migrating out of a physical machine may be monitored using a heartbeat check. In this embodiment, for example, membership status of co-located VMs can be determined by having respective VMs perform periodic heartbeat checks against co-located VMs. In this example, if a VM has been destroyed, suspended or migrated out, the heartbeat check would fail. A failed heartbeat check can then trigger connection dismantling between a lost VM and the co-located VMs.

Figure 5:
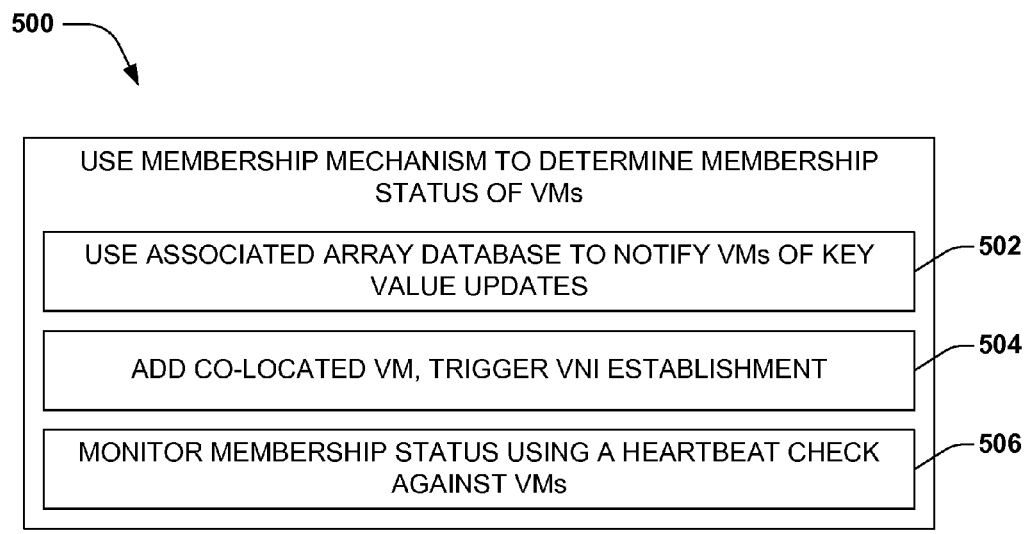
FIG. 5 is an illustration of one embodiment an exemplary method for utilizing a membership mechanism for determining membership status of co-located VMs.

FIG. 5 is an illustration of one embodiment 500 an exemplary method for utilizing a membership mechanism for determining membership status of co-located VMs. At 502, an associated array database (e.g., a key-value pair store) is used to notify respective VMs of key value updates. At 504, a new co-located VM is added to the physical machine, which triggers establishment of a local virtual network interface (VNI). As described above, for example, when a new VM is instantiated on the physical machine a key in the database can be updated with a specified value. In this example, when the key value is updated, notifications can be sent to the existing co-located VMs, which can trigger establishment of a communications channel between the one or more existing co-located VMs and the new VM.

At 506, a heartbeat check against the co-located VMs is used to monitor membership status of respective VMs. As described above, for example, if a co-located VM has been destroyed, suspended or migrated out, the heartbeat check would fail. In this example, this can trigger dismantling of respective connections between a lost VM and the remaining co-located VMs. Further, in this aspect, dismantling of a connection may involve removing an instance of a virtualized network interface, which corresponds to the endpoint of a connection the lost VM, for example. Additionally, in this example, dismantling can involve removal of memory mapping information for the lost VM for the remaining co-located VMs.

Figure 6:
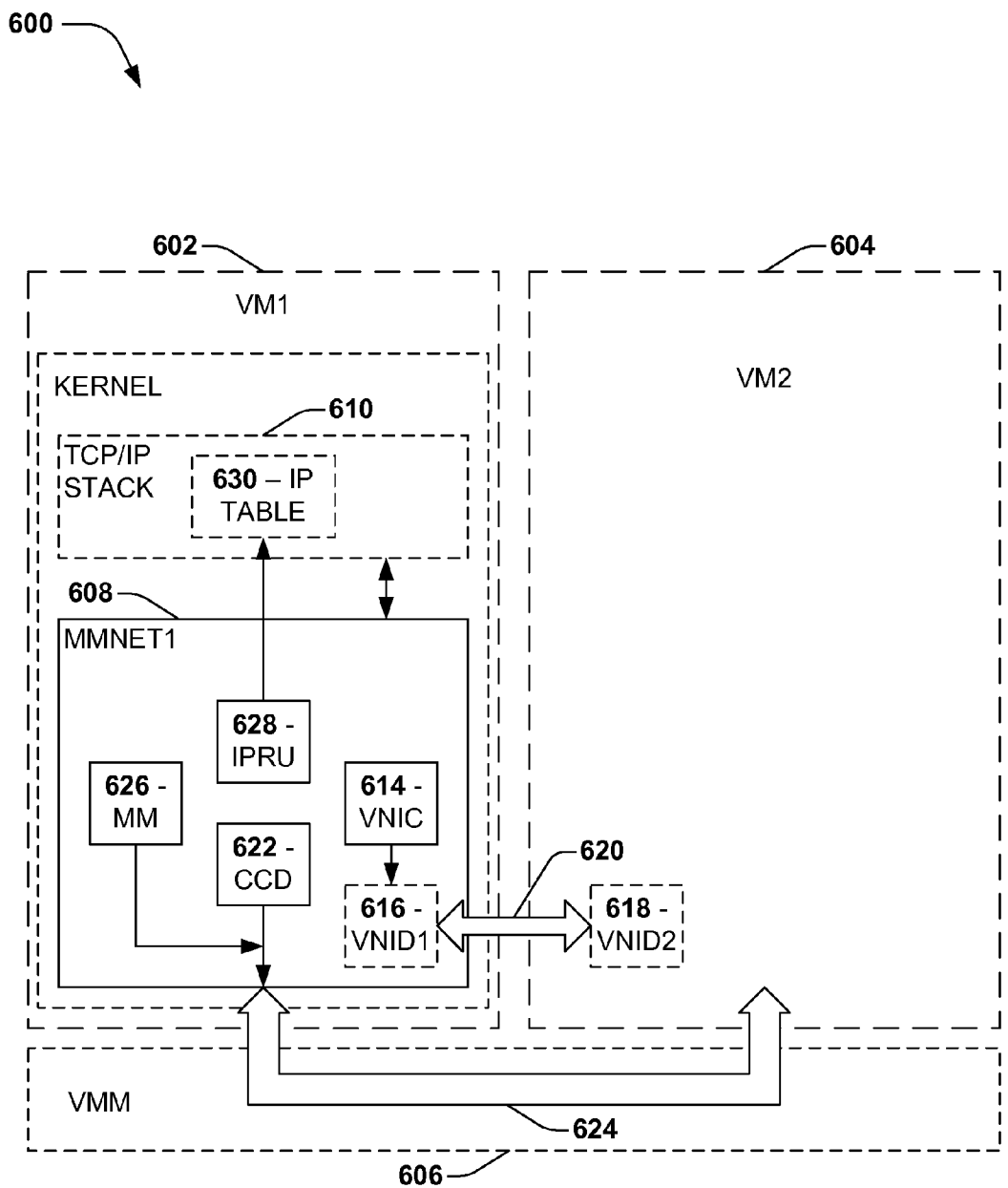
FIG. 6 is a component block diagram of an exemplary system utilizing an embodiment of an exemplary computer program module.

A computer program module may be devised for communicating between two or more virtual machines co-located on a same physical machine. FIG. 6 is a component block diagram of an exemplary system 600 utilizing an exemplary computer program module 608 devised to facilitate communication between two or more virtual machines co-located on a same physical machine. In this embodiment the exemplary module 608 (e.g., a memory mapping network module (MMNET)) comprises a communication channel discoverer 622 configured to initiate a communication channel 624 between a local virtual machine (VM) 602 and one or more co-located VMs 604. As an example, during an initial connection establishment between co-located VMs, an initial control configuration path 624 can be used for initial discovery and configuration of the connection. In this example, the initial control configuration path 624 may be arbitrated by the virtual machine monitor (VMM) 606.

The exemplary computer program module 608 further comprises a memory mapper 626 configured to share memory mapping information between two or more co-located VMs. As an example, when a VM is instantiated on a physical machine with one or more existing co-located VMs, the local memory mapper 626 can transfer memory map information of the local VM's memory to the existing co-located VMs. Further, in this example, memory mappers located on existing co-located VMs can transfer memory map information of their respective VMs memories to the new instantiated VM. In the embodiment 600 memory map information can be transferred using the initial control configuration path 624 initiated by the communication channel discoverer 622.

The exemplary computer program module 608 further comprises a virtualized network interface connector 614 configured to establish a communications channel 620 between two or more virtualized network interfaces 616 and 618 on respective co-located VMs 602 and 604. As an example, the virtualized network interface connector 614 can map an endpoint of a local connection to a virtualized network interface device 616, which is in turn connected to the virtualized network interface device 618 on a co-located VM 604. In this way, the co-located VMs 602 and 604 may communicate directly across direct communications channel 620, instead of using the initial control configuration path 624 through the VMM 624.

The exemplary computer program module 608 further comprises an Internet Protocol (IP) routing updater 628 configured to update IP routing information, such that data transferred between two or more co-located VMs is routed through the local VM's virtualized network interface device 616. In this embodiment, for example, the IP routing updater 628 may update an IP routing table 630 located in a TCP/IP stack 610 of the local VM 602. In this example, the routing table 630 can be updated with the IP address information so that data packet traffic is routed through the local virtualized network interface device 616, using the direct communications channel 620.

Figure 7:
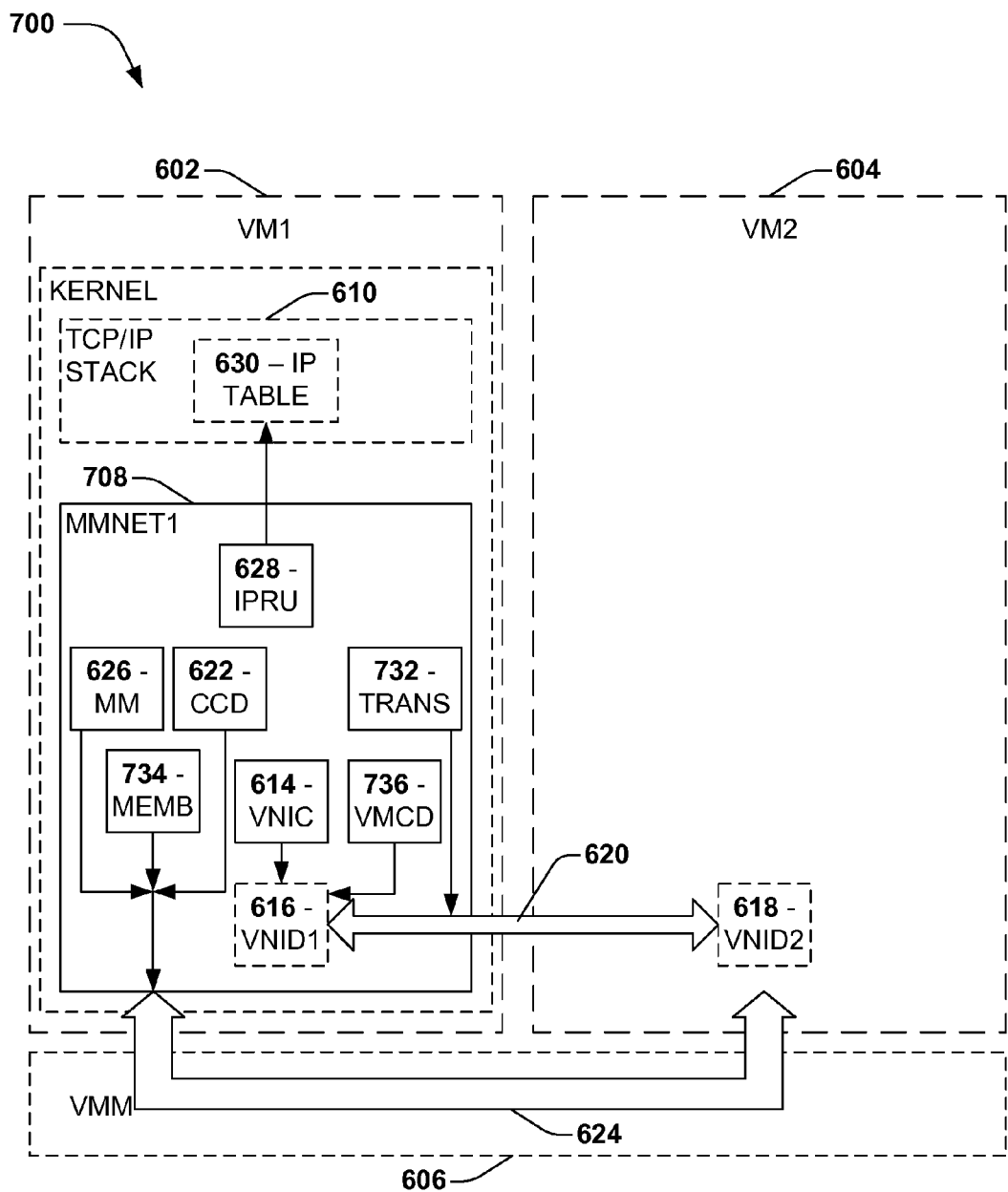
FIG. 7 is a component block diagram of an exemplary system using another embodiment of the exemplary computer program module.

FIG. 7 is a component block diagram of an exemplary system 700 using another embodiment of the computer program module 708. In this embodiment, the computer program module 708 also comprises a membership determination component 734 configured to determine membership status of co-located virtual machines 602 and 604. As an example, the membership determination component 734 can identify when a VM is initiated, resumed or migrated onto a physical machine, and send notifications to co-located VMs. In this example, the identification of a new member VM can trigger connection initiation between the VMs. Further, for example, the membership determination component 734 can perform a heartbeat check against co-located VMs to identify whether a co-located VM has been destroyed, suspended or migrated out. In this example, if the heartbeat check fails against a VM, connection dismantling can be triggered.

In this embodiment, the computer program module 708 also comprises a data translator 732 configured to translate packet data from a first operating system (OS)-specific data packet structure to a second OS-specific data packet structure. As an example, respective co-located VMs 602 and 604 may have a different OS, and may use an OS-specific data packet structure when sending and receiving information across the direct communication channel 620. In this example, the data translator 732 can be used to map a source OS-specific data packet structure to a generic OS-independent data format, and send a packet across a send path in the direct communication channel 620. Further, in this example, the data translator 732 can be used to map the generic OS-independent data format packet to a destination OS-specific data packet structure in a receive path of the direct communication channel 620.

In this embodiment, the computer program module 708 also comprises a virtual machine connection dismantler 736 configured to remove a connection 620 between two or more co-located virtual machines 602 and 604 when an instantiation of a co-located VM 602 is removed. As an example, when a VM is destroyed, suspended or migrated out, the loss of the VM can trigger the virtual machine connection dismantler 736 to remove the connection 620. Removal of the connection 620, for example, can involve removal of memory mapping information of the removed VM 602 from other co-located VMs 604. Connection removal may also trigger removing the mapped endpoint of the local connection from the virtualized network device 616, for example.

Figure 8:
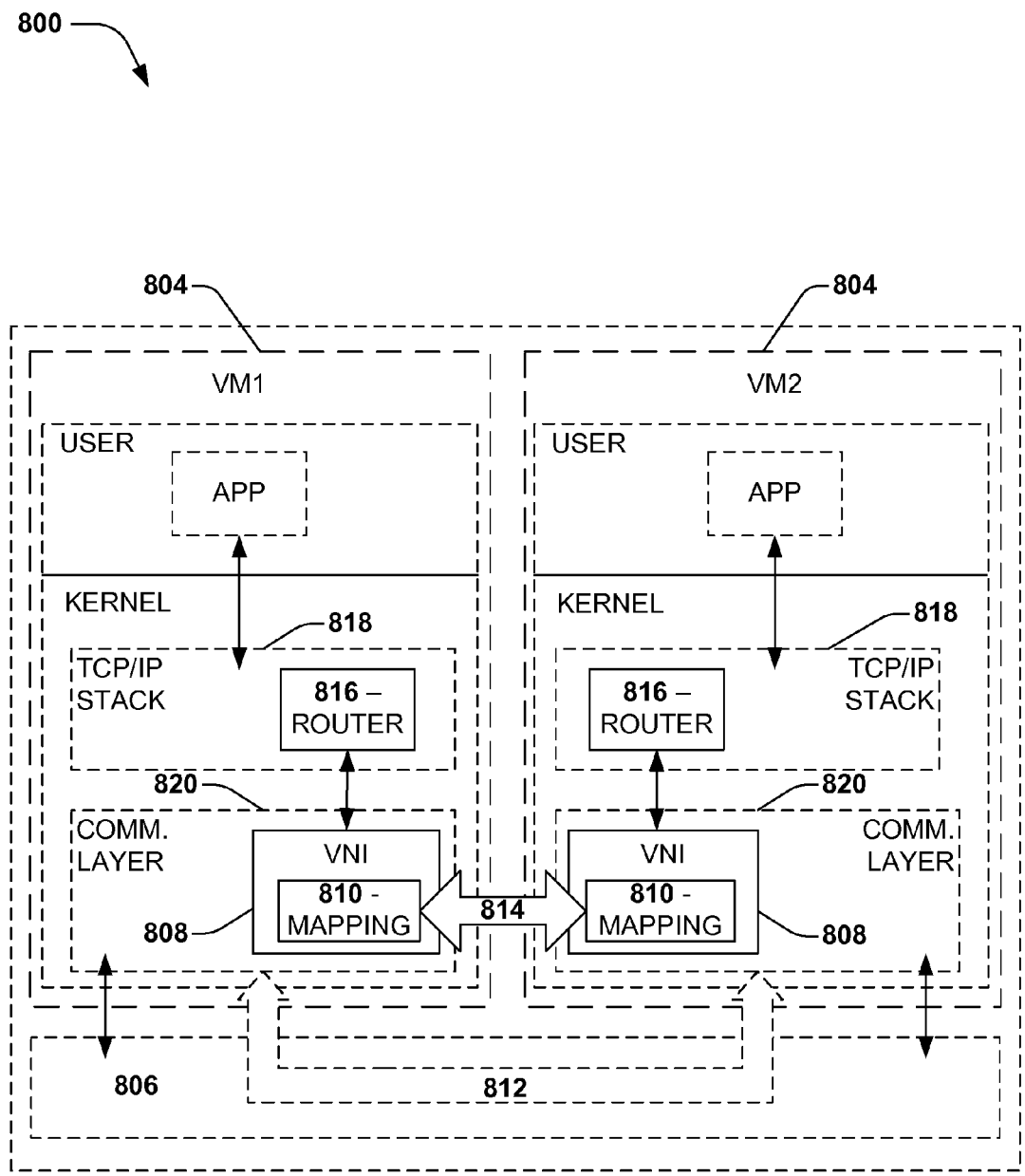
FIG. 8 is a component block diagram of an exemplary system for communicating between two or more virtual machines co-located on a same physical machine.

A system may be devised for communicating between two or more virtual machines co-located on a same physical machine. FIG. 8 is a component block diagram of an exemplary system 800 for communicating between two or more virtual machines co-located on a same physical machine. The exemplary system 800 comprises a memory mapping communicator 810 configured to exchange virtual machine (VM) memory mapping information between two or more co-located virtual machines 804. As an example, when a VM is newly instantiated on a physical machine, the memory mapping communicator 810 can exchange its local physical memory mapping information with existing co-located VMs. It will be appreciated that, while the exemplary system 800 illustrates the memory mapping communicator 810 as located in a specific location, the system described herein is not limited to having the memory mapping communicator 810 located at that position.

The exemplary system 800 further comprises a virtualized network interface 808 on a local virtual machine 804 configured to communicate with one or more co-located virtualized network interfaces 808 of co-located VMs 804. As an example, the virtualized network interfaces 808 may be presented as a network Ethernet interface in a communications layer 820 on the VM 804. In this way, for example, the virtualized network interface 808 can directly communicate with other virtualized network interfaces 808 on co-located VMs 804.

The exemplary system 800 further comprises a virtualized network interface communications channel 814 between two or more co-located virtual network interfaces 808 on co-located VMs 804. As an example, a direct communications channel 814 can be mapped between local virtualized network interfaces 808 that can enable the co-located VMs 804 to communicate directly, and reduce a need to communicate across a hypervisor 806, using a computationally expensive hypervisor channel 812.

The exemplary system 800 further comprises a virtual machine packet data router 816 configured to route data packets transferred between two or more VMs using the virtualized network interface communications channel 814. As an example, the virtual machine packet data router 816 can be an Internet Protocol (IP) routing table located in a TCP/IP stack 818 of the local VM 804, which has been updated with IP information such that data will be transferred using the local virtualized network interface 808, across the virtualized network interface communications channel 814.

In one aspect, a system for communicating between two or more virtual machines co-located on a same physical machine may comprise an operating system (OS)-specific packet data structure translator, configured to translate packet data from a first OS-specific structure to a second OS-specific structure. In this way, for example, if co-located VMs are utilizing a different OS, source OS-specific data may be mapped to a generic OS-independent format in a send path, and the generic OS-independent format may be mapped to destination OS-specific data.

In another aspect, a system for communicating between two or more virtual machines co-located on a same physical machine may comprise a membership determination component, configured to determine membership status of co-located virtual machines. In this way, for example, co-located VMs can identify when a VM is initiated, resumed or migrated onto a physical machine. In this example, this may trigger an initiation of connections between the new VM and existing co-located VMs. Further, the membership determination component can perform a heartbeat check against co-located VMs to determine whether a VM has been destroyed, suspended or migrated out. In this example, if a VM is lost, the heartbeat may fail, which can trigger a dismantling of connections between the lost VM and the co-located VMs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be appreciated that processes, architectures and/or procedures described herein can be implemented in hardware, firmware and/or software. It will also be appreciated that the provisions set forth herein may apply to any type of special-purpose computer (e.g., file server, filer and/or storage serving appliance) and/or general-purpose computer, including a standalone computer or portion thereof, embodied as or including a storage system. Moreover, the teachings herein can be adapted to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

The operations herein described are exemplary and imply no particular order. Further, the operations can be used in any sequence when appropriate and can be partially used (e.g., not all actions may be necessary). It should be understood that various computer-implemented operations involving data storage may comprise manipulation of physical quantities that may take the form of electrical, magnetic, and/or optical signals capable of being stored, transferred, combined, compared and/or otherwise manipulated, for example.

Another example involves computer-readable media comprising processor-executable instructions configured to implement one or more of the techniques presented herein. Computer readable media is intended to comprise any mechanism that can store data, which can be thereafter, be read by a computer system. Examples of computer readable media include hard drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 9:
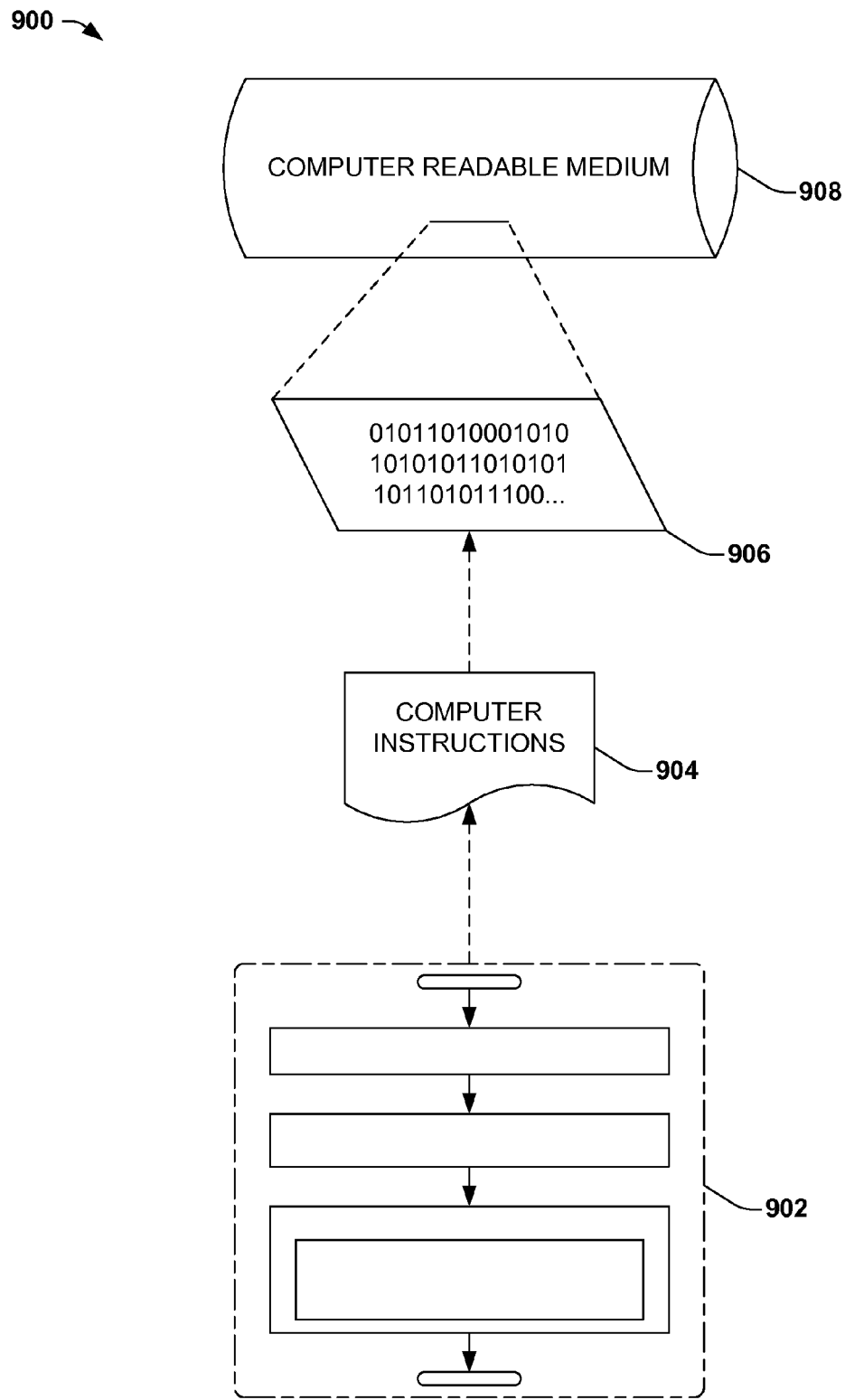
FIG. 9 is an illustration of an exemplary computer-readable medium comprising processor-executable instructions configured to embody one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to the principles set forth herein. In one such embodiment, the processor-executable instructions 904 may be configured to perform a method 902 for managing a cluster of data storage devices comprising a VIF, such as the method 200 of FIG. 2, for example. Many such computer-readable media may be devised by those of ordinary skill in the art that are configured to operate in accordance with the techniques presented herein.

The foregoing description has been directed to particular embodiments. It will be apparent, however, that other variations and modifications may be made to the described embodiments, with the attainment of some or all of their advantages. Specifically, it should be noted that one or more of the principles set forth herein may be implemented in non-distributed file systems. Furthermore, while this description has been written in terms of separate remote and support systems, the teachings are equally suitable to systems where the functionality of the remote and support systems are implemented in a single system. Alternately, the functions of remote and support systems may be distributed among any number of separate systems, wherein respective systems perform one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the spirit and scope of the disclosure herein.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, the word "exemplary" is used herein to mean serving as an example, instance, or illustration. That is anything described herein as "exemplary" is not necessarily to be construed as advantageous over other aspects or designs. Also, unless specified to the contrary, the term "or" is intended to mean an inclusive "or" rather than an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

What is claimed is:

1. A method for facilitating communication between a first virtual machine and a second virtual machine located on a physical host, comprising:
    establishing a communication channel between a first virtualized network device of the first virtual machine and a second virtualized network device of the second virtual machine located on the physical host, the first virtual machine hosting a first operating system and the second virtual machine hosting a second operating system different than the first operating system, the establishing comprising:
        creating a shared metadata segment between the first virtual machine and the second virtual machine; and
        exchanging memory mapping information between the first virtual machine and the second virtual machine over the shared metadata segment;
    transmitting, from the first virtualized network device and over a first portion of the communication channel, a source data packet generated by the first operating system, the source data packet having a first format according to the first operating system;
    reformatting, using memory mapping pointers associated with the memory mapping information, the source data packet to generate a destination data packet; and
    transmitting the destination data packet over a second portion of the communication channel to the second virtualized network device.

2. The method of claim 1, the reformatting comprising:
    responsive to determining that the source data packet is formatted according to a first communication protocol that is different than a second communication protocol utilized by the second operating system, reformatting the source data packet according to the second communication protocol to generate the destination data packet.

3. The method of claim 1, the reformatting comprising:
    mapping the source data packet into an OS-independent data packet layout utilizing at least some of the memory mapping pointers associated with the memory mapping information.

4. The method of claim 3, the reformatting comprising:
    packing the source data packet into an OS-independent shared memory communication format based upon the OS-independent data packet layout.

5. The method of claim 4, the packing comprising:
    utilizing at least some of the memory mapping pointers associated with the memory mapping information to pack source data packet mapping information, associated with the source data packet, into the OS-independent shared memory communication format.

6. The method of claim 4, comprising:
    extracting destination data packet mapping information from the OS-independent shared memory communication format using at least some of the memory mapping pointers associated with the memory mapping information.

7. The method of claim 6, comprising:
    packing the destination data packet mapping information into the destination data packet.

8. The method of claim 2, the first communication protocol specifying a first element type and a first data format used by the first operating system, the first element type and the first data format are not natively utilized by the second operating system.

9. The method of claim 5, the packing comprising:
packing the source data packet into the OS-independent shared memory communication format according to a zero-copy technique without creating a copy of the source data packet.

10. The method of claim 1, the second virtualized network device comprising a virtual network interface.

11. A system for facilitating communication between a first virtual machine and a second virtual machine located on a physical host, comprising:
one or more processors; and
memory comprising instructions that when executed by at least one of the one or more processors perform a method, comprising:
establishing a communication channel between a first virtualized network device of the first virtual machine and a second virtualized network device of the second virtual machine located on the physical host, the first virtual machine hosting a first operating system and the second virtual machine hosting a second operating system different than the first operating system, the establishing comprising:
creating a shared metadata segment between the first virtual machine and the second virtual machine; and
exchanging memory mapping information between the first virtual machine and the second virtual machine over the shared metadata segment;
transmitting, from the first virtualized network device and over a first portion of the communication channel, a source data packet generated by the first operating system, the source data packet having a first format according to the first operating system;
reformatting, using memory mapping pointers associated with the memory mapping information the source data packet to generate a destination data packet; and
transmitting the destination data packet over a second portion of the communication channel to the second virtualized network device.

12. The system of claim 1, the reformatting comprising:
mapping the source data packet into an OS-independent data packet layout utilizing at least some of the memory mapping pointers associated with the memory mapping information.

13. The system of claim 12, the reformatting comprising:
packing the source data packet into an OS-independent shared memory communication format based upon the OS-independent data packet layout.

14. The system of claim 13, the packing comprising:
utilizing at least some of the memory mapping pointers associated with the memory mapping information to pack source data packet mapping information, associated with the source data packet, into the OS-independent shared memory communication format.

15. The system of claim 11, the reformatting comprising:
responsive to determining that the source data packet is formatted according to a first communication protocol that is different than a second communication protocol utilized by the second operating system, reformatting the source data packet according to the second communication protocol to generate the destination data packet.

16. The system of claim 13, the method comprising:
extracting destination data packet mapping information from the OS-independent shared memory communication format using at least some of the memory mapping pointers associated with the memory mapping information.

17. The system of claim 16, the method comprising:
packing the destination data packet mapping information into the destination data packet.

18. A non-transitory computer-readable medium comprising processor-executable instructions that when executed perform a method for facilitating communication between a first virtual machine and a second virtual machine located on a physical host, comprising:
establishing a communication channel between a first virtualized network device of the first virtual machine and a second virtualized network device of the second virtual machine located on the physical host, the first virtual machine hosting a first operating system and the second virtual machine hosting a second operating system different than the first operating system, the establishing comprising:
creating a shared metadata segment between the first virtual machine and the second virtual machine; and
exchanging memory mapping information between the first virtual machine and the second virtual machine over the shared metadata segment;
transmitting, from the first virtualized network device and over a first portion of the communication channel, a source data packet generated by the first operating system, the source data packet having a first format according to the first operating system;
reformatting, using memory mapping pointers associated with the memory mapping information, the source data packet to generate a destination data packet; and
transmitting the destination data packet over a second portion of the communication channel to the second virtualized network device.

19. The non-transitory computer-readable medium of claim 18, the reformatting comprising:
responsive to determining that the source data packet is formatted according to a first communication protocol that is different than a second communication protocol utilized by the second operating system, reformatting the source data packet according to the second communication protocol to generate the destination data packet.

20. The non-transitory computer-readable medium of claim 19, the first communication protocol specifying a first element type and a first data format used by the first operating system, the first element type and the first data format not natively utilized by the second operating system.

* * * * *